April 19, 1966  S. Z. SIWEK  3,246,909
HANDLE MOUNTING ASSEMBLY FOR LAWN MOWERS AND THE LIKE
Filed April 10, 1964  2 Sheets-Sheet 1

INVENTOR.
STANLEY Z. SIWEK
BY
ATTORNEY

April 19, 1966 S. Z. SIWEK 3,246,909
HANDLE MOUNTING ASSEMBLY FOR LAWN MOWERS AND THE LIKE
Filed April 10, 1964 2 Sheets-Sheet 2

INVENTOR.
STANLEY Z. SIWEK
BY *Malcolm J. Bradway*
ATTORNEY

United States Patent Office 3,246,909
Patented Apr. 19, 1966

3,246,909
HANDLE MOUNTING ASSEMBLY FOR LAWN MOWERS AND THE LIKE
Stanley Z. Siwek, Chicago, Ill., assignor to Pioneer Gen-E-Motor Corporation, Chicago, Ill.
Filed Apr. 10, 1964, Ser. No. 358,802
4 Claims. (Cl. 280—47.37)

The present invention is directed to a new and improved handle mounting assembly for hand manipulated articles such as power lawn mowers.

In handles of this class, it is considered desirable to so mount the handle that it has a limited range of swinging movement in an operative position in which the handle extends upwardly and rearwardly from the machine so as to provide some yieldability of the handle in the event the machine strikes an obstruction while at the same time preventing movement of the handle to an upright position when encountering such an obstruction, all to prevent the operator from stumbling over the machine itself. It is also considered desirable to provide some means to allow the handle to swing to an upright position for purposes of conserving space in storage.

Various types of mechanisms to accomplish these ends have been proposed and used in the past. Some of these past mounting mechanisms have been overly expensive as to cost of manufacture, others require use of the operator's hand to release a latching mechanism to enable movement to the upright position, and still others for one reason or another do not always operate satisfactorily. With this in mind, the major purposes of the present invention are to so form a handle mounting mechanism that the aforesaid types of movement are accomplished, to so arrange the mounting mechanism that it is simple in form and economical to manufacture, to so arrange the mechanism that the operator may use his foot to release the latching mechanism and allow the handle to be moved to and from an upright position, while preventing movement of the handle to an upright position when the handle is intended for operation; these and other purposes being more apparent in the course of the ensuing specification and claims when taken with the accompanying drawings in which:

Figure 1:
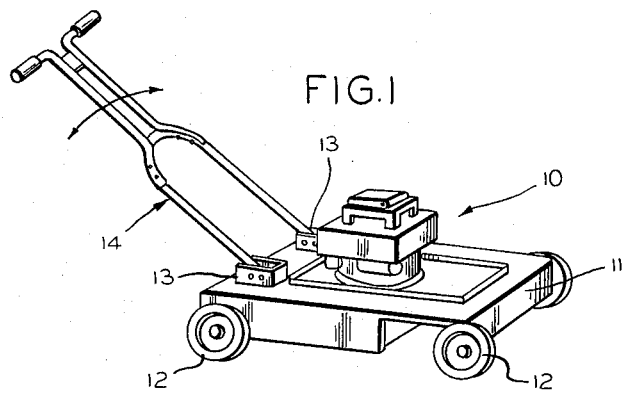
FIGURE 1 is a diagrammatic view of a lawn mower illustrating the various handle positions of the mower.
Figure 2:
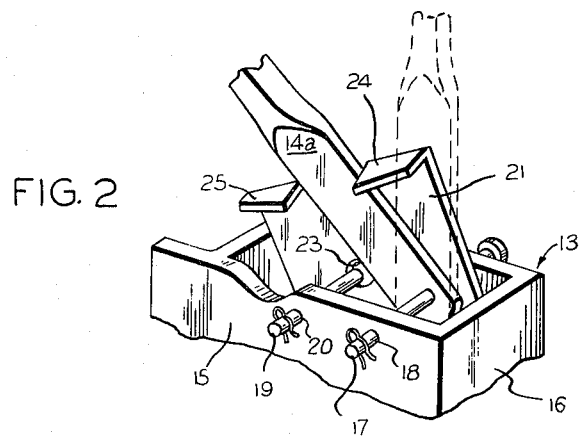
FIGURE 2 is a perspective view of a handle mount incorporating the principles of the present invention.

The invention is shown in the drawings for the purposes of illustration embodied in a lawn mower 10 having a housing 11 mounted on wheels 12. A pair of spaced handle mounts or supports 13 are positioned on the top of the housing and a handle 14 is connected to these mounts by means of spaced handle portions 14a. Each handle mount is made of a pair of spaced, parallel, upstanding walls 15 extending longitudinally of the housing and having their ends connected by laterally extending, upstanding walls 16 to form a rectangular, open-top, box-like structure. Each handle portion 14a is pivotally attached to one of the mounts by a pin 17 which extends through apertures 18 in the longitudinal walls 15 of the mount. A stop pin 19 is positioned in each mount above and rearwardly of the pivot pin 17 to engage the handle portion 14a and limit rearward and downward movement of the handle. This pin is mounted in apertures 20 in the longitudinal walls.

To limit the forward and upward rotation of the handle around the pivot pin 17 during operation of the mower and to hold the handle in an upright position for storage, a latch plate 21 is positioned in one or the other, or both of the mounts 13. The latch plate is shaped from a flat, resilient piece of metal and has apertures 22 and 23 which are spaced to fit over the pivot pin 17 and stop pin 19, respectively. The stop pin aperture 23 in the plate is larger than the diameter of the stop pin 19 to allow some movement of the latch plate relative to the stop pin and rotation thereof relative to the pivot pin.

A portion of the top of the latch plate 21 is bent to form a laterally extending tab or stop 24 which projects outwardly of the housing and into the path of rotation of the handle portion 14a about the pivot pin 17 to provide an abutment for the handle to limit the upward and forward swinging movement of the handle portion when the handle is in its operation position. The handle has a limited range of movement between stop pin 19 and tab 24. The limited movement of the latch plate relative to the stop pin provides additional yieldability for the handle when the handle engages and is stopped during its forward and upward movement by engagement with the tab. A second laterally extending tab 25 is positioned rearwardly of the first tab and projects in the same direction as the first tab. This tab is positioned so that it is rearward of the handle portion 14a when the handle is in its operating position. The operator of the mower can push against this tab with his foot when it is desired to resiliently bend the latch plate to move the tab 24 out of the path of rotation of the handle to permit movement of the handle to and from its operative and upright positions.

The apertures 22 and 23 are so positioned that the plate will extend in a rearwardly and upwardly direction when the plate is positioned in the mount with the pivot and stop pins extending through their respective apertures. This provides a space between the forward tab 24 and the front lateral wall 16 of the mount for the handle to receive the handle portion 14a when it is moved to its upright position. The tab 24 and the wall 16 will confine the handle portion 14a to hold it in this upright position.

The handle portions 14a have a normal spacing which is slightly less than the space between the handle mounting structures 13. The handle portions are spread apart, against the resiliency thereof, when mounting the handle on the pins 17 and 19. The pressure of the handle portion pushes inwardly against the latch plate 21, and keeps the latch plate snugly against the upstanding wall 16 of the handle mounting support.

Figure 3:
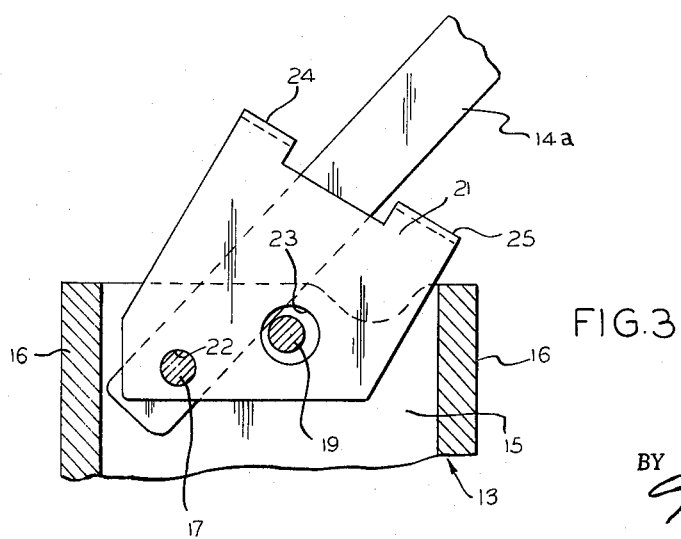
FIGURE 3 is a detailed side view of the handle mounting mechanism illustrated in FIGURE 2.
Figure 4:
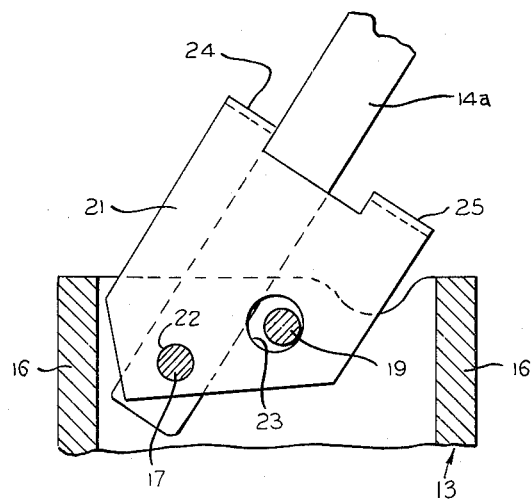
FIGURE 4 is a view similar to FIGURE 3 but illustrating another position of the elements of FIGURE 3.

In use, the latch plate effectively limits the handle 14 to a small range of swinging movement in the normal, operative position as illustrated by the extreme positions of FIGURES 3 and 4. This disposes the handle at an inclination to the horizontal of approximately 40° to 45° while allowing a range of swinging movement to approximately 46° to 55°. Downward movement of the handle is prevented by the stop-pin 19. When the operator desires to turn a corner, he may bear down slightly on the end of the handle to apply pressure to the pins 17 and 19 and remove weight from the front wheels 12 of the mower to facilitate turning. The upper range of movement is limited by abutment with the projecting tab 24 of the latch plate 21 as is seen in FIGURE 4.

Figure 5:
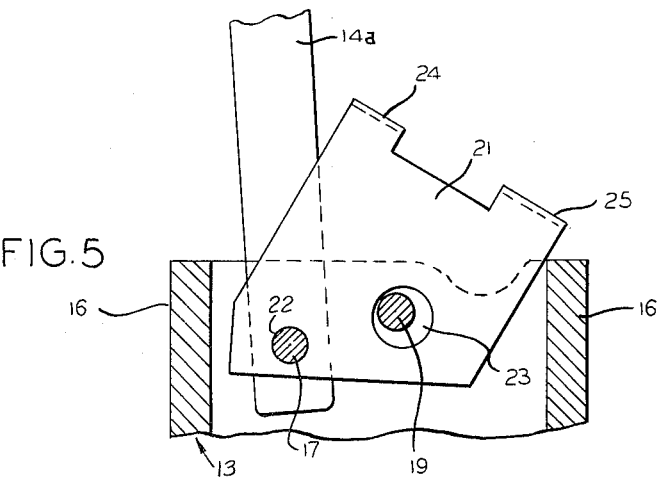
FIGURE 5 is a view similar to FIGURE 3 but illustrating an upright disposition of the manipulating handle of FIGURE 3.
Figure 6:
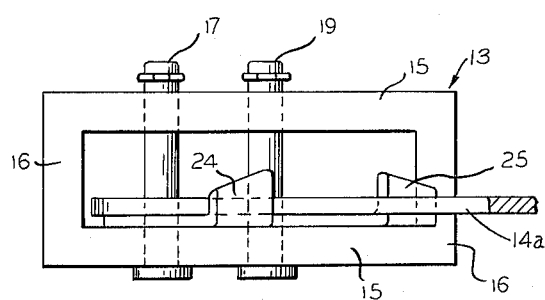
FIGURE 6 is a top view of FIGURE 3 looking in the direction of the arrow 6—6 of FIGURE 3.

When the operator desires to store the mower 10 with the handle 14 upright, he may, for example, through foot pressure, press the upper portion of the latch plate 21 inwardly toward the center of the mower and swing the handle to the upright position as seen in FIGURE 5. In this upright position, the handle is confined between the forward edge of the tab 24 and the laterally extending wall 16 of the handle mounting structure 13. To return the handle to the operative position, the operator may again apply foot pressure to the upper portion of the latch plate, as through the lateral tab 25 and swing the handle back against the stop pin 19. Upon release of foot pressure from the latch plate, the plate returns to its normal position wherein the handle is confined by the tab 24 and the pin 19.

Through use of the enlarged aperture 23 in the latch plate 21, the range of movement of the handle 14 is gained both by movement of the handle to its abutting position with the tab 24 and through a slight movement of the latch plate itself, as will be appreciated in FIGURES 3 and 4. The enlarged aperture 23 also provides for ease of assembly in that the latch plate is capable of some movement for purposes of properly aligning the latch plate aperture and handle aperture for reception of the pivot pin 17.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A handle structure for wheel supported articles having a manipulating handle extended rearwardly and upwardly from a wheel supported base and including a handle pivot support on said base and carrying a pivot pin with a handle swingably mounted on said pin, the improvement comprising a plate positioned along said pivot support, said plate being carried by said pivot pin, said plate including an aperture spaced rearwardly from said pivot pin, an additional pin carried by said support and extending through said aperture, said plate including a projecting portion positioned above and rearwardly from said pivot pin, said projecting portion extending laterally from the remainder of said plate and positioned to provide an abutment for said handle so as to limit upward swinging movement of said handle, said second named pin limiting downward swinging movement of said handle, said projecting portion being yieldable laterally away from the path of swinging movement of said handle so as to allow said handle to move past said projecting portion and to generally upright position wherein downward swinging movement of said handle is limited by said projection.

2. The structure of claim 1 wherein said aperture is slightly larger than said second named pin so as to allow a limited amount of swinging movement of said plate with said handle.

3. A manipulating handle structure for wheel supporting bases including a wheel supported base, said base having a pair of upstanding pivot mounts thereon, pivot pins carried by said mounts and a handle having spaced portions pivotally mounted on said pins and extending upwardly with respect thereto, said spaced portions of said handle being spaced apart normally by a distance less than the space between said pivot mounts so that when the spaced portions are on said pins, the spaced portions exert pressure against said mounts, and a latch plate carried by one mount and positioned between said one mount and the handle portion associated therewith, said latch plate including an upstanding projection positioned above said pivot pin and offset rearwardly with respect to said pin, said projection having a normal position in the path of swinging movement of said handle so as to limit upward swinging movement of said handle to a predetermined inclination, means limiting downward swinging movement of said handle, said plate being resilient, the lateral dimension of said projection being such, with relation to the resiliency of said plate, that said projection may be moved resiliently out of the path of swinging movement of said handle to thereby allow consequent movement of said handle to a generally upright position.

4. The structure of claim 3 wherein said one handle mount includes a laterally extended wall positioned forwardly of said pivot pin so that when said handle is in said upright position, movement of said handle is confined between said laterally extended portion and said projecting portion.

References Cited by the Examiner

UNITED STATES PATENTS

| | | | |
|---|---|---|---|
| 1,697,727 | 1/1929 | Haehl | 74—533 |
| 2,246,919 | 6/1941 | Krantz | 200—169 |
| 2,757,013 | 7/1956 | Brier | 280—47.37 |
| 2,965,386 | 12/1960 | Buske | 280—47.37 |
| 3,116,937 | 1/1964 | Price | 280—47.37 |
| 3,135,234 | 6/1964 | Turnidge. | |

BENJAMIN HERSH, *Primary Examiner.*

A. HARRY LEVY, *Examiner.*